(No Model.)
A. B. IRELAND.
SAW.
No. 334,440. Patented Jan. 19, 1886.
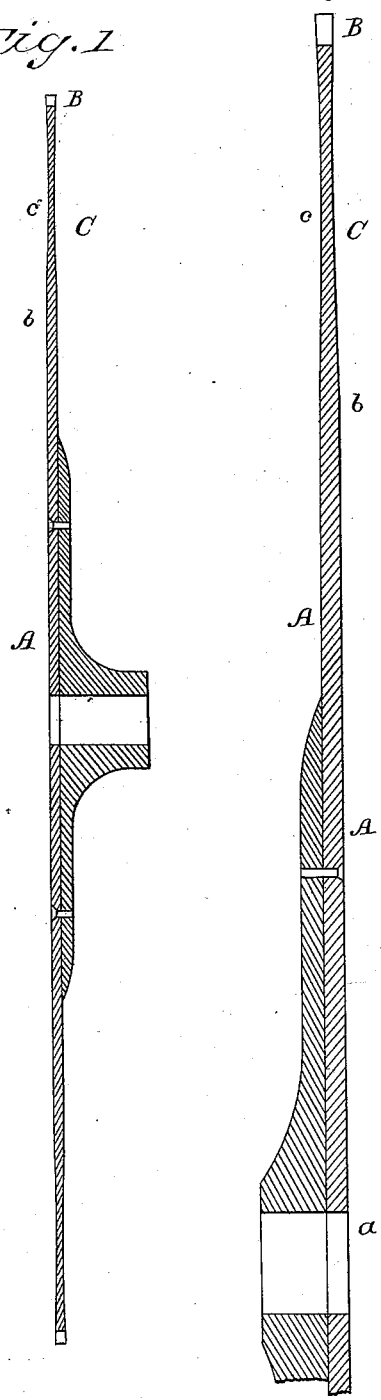
WITNESSES
Ed. A. Newman.
Al. C. Newman.
INVENTOR
A. Bertsell Ireland,
By his Attorneys
Baldwin, Hopkins & Peyton.

UNITED STATES PATENT OFFICE.

A. BERTSELL IRELAND, OF GREENE, NEW YORK.

SAW.

SPECIFICATION forming part of Letters Patent No. 334,440, dated January 19, 1886.

Application filed June 6, 1885. Serial No. 167,883. (No model.)

*To all whom it may concern:*

Be it known that I, A. BERTSELL IRELAND, of Greene, Chenango county, New York, have invented certain new and useful Improvements in Saws, of which the following is a specification.

My invention is applicable to all kinds of saws; but it is especially designed for circular saws.

In the accompanying drawings my improvements are shown as applied to a circular saw.

Figure 1 is a cross-section, and Fig. 2 a similar enlarged view showing the dishing of the saw.

Saw-teeth have heretofore been "set" for the purpose of clearing the way for the body of the saw, and thus reduce the friction caused by the rubbing of the sides of the saw against the material being cut; but it is impossible to make such a saw cut smooth and true. Circular saws have also been made thickest at the edge and gradually tapering to the center, but these saws are not so strong and will not cut so true as straight saws.

My improved saw is preferably made of a single piece of metal, and is straight from center to circumference, except for a short space between the extreme edge and the central portion of the saw, where it is dished, concaved, or cut in on both sides, thereby giving the saw a perpetual set, and in operation a clearance as soon as it begins to cut.

Referring to the drawings, A indicates the central portion of the saw; B, the edge, and C the dished portion. From the center $a$ to the point $b$ the saw is straight or of uniform cross-section. The extreme edge of the teeth may be equal in cross-section to the central portion, as in Fig. 1. From the edge of the teeth to $c$, and from $c$ to $b$, the saw is dished, concaved, or cut in on both sides.

My improved saw may be made from a saw of uniform thickness by grinding out the concaves at the edge, as above indicated. I deem it important that the dishing begin at the extreme edge of the saw-teeth, as it is very difficult to make a saw work where the teeth are straight at the edge even for a very short distance.

Of course there are some details of construction that may be changed. The central portion of the saw need not necessarily be of the same thickness throughout, and, if preferred, the extreme edge may be somewhat thicker than the center; or, as I prefer, the center may be somewhat thicker than the edge, as shown in Fig. 2. The saw is shown as having a concaved depression on both sides at its edge, but the depression may be formed by straight inclines from the edge to the point $c$, and from $c$ to $b$. By the term "dished" I mean depressions of all kinds.

My saw is especially designed for use in shingle-cutting machines, where it is very effective in its operation.

The patent of Hale, No. 148,748, shows a saw which tapers from the edge inwardly all the way to the center. As remarked at the beginning of this specification, I am aware that saws of this character are old, and I do not, therefore claim such subject-matter.

I claim as my invention—

1. A saw formed with a depression or dish on each side, which commences at its extreme edge or periphery and extends inwardly for a suitable distance part way across the face of the saw to the inner or central undished part of the saw-body, substantially as shown and described.

2. A circular saw having its central part or body slightly thicker than the teeth or periphery, and dished on each side from its extreme edge or periphery inwardly to the saw-body.

In testimony whereof I have hereunto subscribed my name.

A. B. IRELAND.

Witnesses:
A. B. HOLCOMB,
ALBA A. SKINNER.